(12) United States Patent
Pulliero et al.

(10) Patent No.: US 12,398,681 B2
(45) Date of Patent: Aug. 26, 2025

(54) BUILT-IN TEST OF ACTIVELY CONTROLLED FUEL NOZZLES

(71) Applicant: RTX Corporation, Farmington, CT (US)

(72) Inventors: Alessio Pulliero, Glastonbury, CT (US); Gary McBrien, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/466,508

(22) Filed: Sep. 13, 2023

(65) Prior Publication Data

US 2025/0084798 A1    Mar. 13, 2025

(51) Int. Cl.
*F02C 9/26* (2006.01)
*F02C 7/232* (2006.01)

(52) U.S. Cl.
CPC .............. *F02C 9/263* (2013.01); *F02C 7/232* (2013.01)

(58) Field of Classification Search
CPC .. F02C 9/263; F02C 9/28; F02C 7/232; F02C 7/222; F16K 37/0075; F16K 37/0083; F16K 37/0091; G01M 13/003; G01M 13/00

See application file for complete search history.

(56) References Cited

U.S. PATENT DOCUMENTS

| | | |
|---|---|---|
| 5,641,891 A | 6/1997 | Frankl et al. |
| 6,016,832 A | 1/2000 | Vars et al. |
| 6,148,601 A | 11/2000 | Jones et al. |
| 6,389,816 B1 | 5/2002 | McCarty et al. |
| 6,782,317 B2 | 8/2004 | Mitchell et al. |

(Continued)

FOREIGN PATENT DOCUMENTS

EP    3670874 A1    6/2020

OTHER PUBLICATIONS

Search Report issued in European Patent Application No. 24200381.2; Date of Mailing Jan. 27, 2025 (4 pages).

*Primary Examiner* — Kristina N Junge
*Assistant Examiner* — Jingchen Liu
(74) *Attorney, Agent, or Firm* — CANTOR COLBURN LLP

(57) ABSTRACT

A method for detecting performance degradation of an AC Nozzle in a gas turbine engine including operating the gas turbine engine under a normal operating condition, maintaining the fuel flow rate at a constant fuel flow rate, determining a delta pressure $P_{Delta-Normal}$ across an N number of Proportional Metering Valves (PMVs) as the gas turbine engine is operating under the normal operating condition, selecting a PMV and an AC Nozzle, controlling the PMV to modify a fuel flow rate to the selected AC Nozzle to cause the gas turbine engine to operate under a modified fuel flow condition, determining a delta pressure $P_{Delta-Modified}$ across the N number of PMVs as the gas turbine engine is operating under the modified operating condition and comparing the delta pressure $P_{Delta-Normal}$ with the delta pressure $P_{Delta-Modified}$ to determine if the selected AC Nozzle is uncalibrated or has failed.

16 Claims, 3 Drawing Sheets

(56) References Cited

U.S. PATENT DOCUMENTS

| | | | |
|---|---|---|---|
| 8,666,632 B2* | 3/2014 | Zebrowski | F02C 7/228 |
| | | | 701/100 |
| 9,115,647 B2 | 8/2015 | Andre et al. | |
| 10,087,852 B2 | 10/2018 | Eifert et al. | |
| 10,317,082 B2* | 6/2019 | McBrien | F02C 7/222 |
| 10,322,821 B2 | 6/2019 | Kuhns et al. | |
| 11,414,206 B2 | 8/2022 | Freeth et al. | |
| 2010/0256888 A1* | 10/2010 | Tong | F02C 9/263 |
| | | | 701/100 |
| 2015/0321767 A1* | 11/2015 | Kamath | F02C 3/22 |
| | | | 244/135 C |
| 2016/0201575 A1* | 7/2016 | Bertsch, IV | F02C 9/263 |
| | | | 137/15.18 |
| 2017/0114726 A1* | 4/2017 | Selstad | F16K 37/0075 |
| 2017/0292457 A1* | 10/2017 | Selstad | F02C 9/44 |
| 2017/0356283 A1* | 12/2017 | Al-Gouhi | E21B 47/09 |
| 2018/0106197 A1 | 4/2018 | Harper et al. | |
| 2022/0003173 A1* | 1/2022 | Joudareff | F02C 7/232 |
| 2024/0084741 A1* | 3/2024 | Murray | F02C 7/222 |

* cited by examiner

BUILT-IN TEST OF ACTIVELY CONTROLLED FUEL NOZZLES

BACKGROUND

This disclosure relates to a gas turbine engine, and more particularly to fuel nozzles that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Additionally, gas turbine engines have a plurality of fuel nozzles that are evenly spaced around the circumference of the combustor diffuser nozzle case to inject a highly atomized precisely formed spray of fuel into the combustion chamber. An electronic controller, controls the valves in the Hydromechanical Unit (HMU) to supply metered fuel flow to the engine and to distribute fuel to the fuel nozzles. Actively Controlled Fuel Nozzles (AC Nozzles) are a new technology that is still under development. Typically, the AC Nozzle includes electrical effectors (e.g., solenoids or electrical motors) and valves that change the effective area of a single fuel nozzle or of a subset of fuel nozzles. This may offer the ability to calibrate fuel flow on a particular combustor sector.

However, due to the high temperatures of the AC Nozzle environment, the use of position feedback sensors have not been possible. This inability to detect failure or loss of calibration of an AC Nozzle can have a deleterious effect on the performance of an engine. The failure of an AC Nozzle can result in hot streaks which can cause localized hot spots on the blade surfaces in a high-pressure turbine, increasing the heat load locally and even leading to material loss in regions such as the rotor blade tip. This can negatively impact turbine durability and/or performance degradation.

BRIEF DESCRIPTION

Disclosed is a method for detecting performance degradation of an Actively Controlled Fuel Nozzle (AC Nozzle) in a gas turbine engine, wherein the method includes operating the gas turbine engine under a normal operating condition to power the gas turbine engine at a constant speed, maintaining the fuel flow rate to the gas turbine engine at a constant fuel flow rate, determining a delta pressure $P_{Delta-Normal}$ across an N number of Proportional Metering Valves (PMVs) as the gas turbine engine is operating under the normal operating condition, selecting a PMV and an associated AC Nozzle from a plurality of PMVs and a plurality of AC Nozzles, controlling the PMV to modify a fuel flow rate to the selected AC Nozzle to cause the gas turbine engine to operate under a modified fuel flow condition, determining a delta pressure $P_{Delta-Modified}$ across the N number of PMVs as the gas turbine engine is operating under the modified operating condition and comparing the delta pressure $P_{Delta-Normal}$ with the delta pressure $P_{Delta-Modified}$ to determine if the selected AC Nozzle is uncalibrated or has failed.

In addition to one or more of the features described above, or as an alternative to any of the foregoing embodiments, wherein operating includes operating the gas turbine engine at an idle speed.

In addition to one or more of the features described above, or as an alternative to any of the foregoing embodiments, wherein maintaining includes maintaining the constant fuel flow rate via a main fuel metering valve controlled by an electronic controller.

In addition to one or more of the features described above, or as an alternative to any of the foregoing embodiments, wherein determining a delta pressure $P_{Delta-Normal}$ includes measuring a PF3 pressure downstream from a Main Fuel Metering Valve (MFMV) and a Fuel Flow Meter (FFM), measuring a fuel flow at the FFM and measuring a combustor pressure Pb within a combustion chamber while the gas turbine engine is operating under the normal operating condition.

In addition to one or more of the features described above, or as an alternative to any of the foregoing embodiments, wherein determining a delta pressure $P_{Delta-Normal}$ further includes referencing a predicted pressure map to determine a predicted pressure drop $P_{man\_plum}$ across a manifold and fuel lines after the FFM and before fuel is distributed to each of the plurality of PMVs.

In addition to one or more of the features described above, or as an alternative to any of the foregoing embodiments, wherein determining a delta pressure $P_{Delta-Normal}$ further includes subtracting the predicted pressure drop $P_{man\_plum}$ from the PF3 pressure to determine a $P_{vup}$ value and subtracting the combustor pressure Pb from the $P_{vup}$ value.

In addition to one or more of the features described above, or as an alternative to any of the foregoing embodiments, wherein controlling includes controlling the selected PMV via an electronic controller to cause the fuel flow rate to the selected AC Nozzle to decrease.

In addition to one or more of the features described above, or as an alternative to any of the foregoing embodiments, wherein controlling includes controlling the selected PMV via an electronic controller to cause the fuel flow rate to the selected AC Nozzle to increase.

In addition to one or more of the features described above, or as an alternative to any of the foregoing embodiments, wherein determining a delta pressure $P_{Delta-Modified}$ includes measuring a PF3 pressure downstream from a Main Fuel Metering Valve (MFMV) and a Fuel Flow Meter (FFM), measuring a fuel flow at the FFM and measuring a combustor pressure Pb within a combustion chamber while the gas turbine engine is operating under the modified operating condition.

In addition to one or more of the features described above, or as an alternative to any of the foregoing embodiments, wherein determining a delta pressure $P_{Delta-Modified}$ further includes referencing a predicted pressure map to determine a predicted pressure drop $P_{man\_plum}$ across a manifold and fuel lines after the FFM and before fuel is distributed to each of the plurality of PMVs.

In addition to one or more of the features described above, or as an alternative to any of the foregoing embodiments, wherein determining a delta pressure $P_{Delta-Modified}$ further includes subtracting the predicted pressure drop $P_{man\_plum}$ from the PF3 pressure to determine a $P_{vup}$ value and subtracting the combustor pressure Pb from the $P_{vup}$ value.

In addition to one or more of the features described above, or as an alternative to any of the foregoing embodiments, wherein comparing includes comparing the delta pressure $P_{Delta}$-Normal with the delta pressure $P_{Delta-Modified}$ to identify if a variation exists between the delta pressure $P_{Delta-Normal}$ and the delta pressure $P_{Delta-Modified}$.

Also disclosed is a method for detecting performance degradation of an Actively Controlled Fuel Nozzle (AC Nozzle) in a gas turbine engine, wherein the method includes operating the gas turbine engine under a normal operating condition to power the gas turbine engine at a constant speed, determining a delta pressure $P_{Delta-Normal}$ across an N number of Proportional Metering Valves (PMVs) as the gas turbine engine is operating under the normal operating condition, controlling a selected PMV to modify a fuel flow rate to a selected AC Nozzle to cause the gas turbine engine to operate under a modified fuel flow condition, determining a delta pressure $P_{Delta-Modified}$ across the N number of PMVs as the gas turbine engine is operating under the modified operating condition and comparing the delta pressure $P_{Delta-Normal}$ with the delta pressure $P_{Delta-Modified}$ to determine if the selected AC Nozzle is uncalibrated or has failed.

In addition to one or more of the features described above, or as an alternative to any of the foregoing embodiments, wherein operating includes operating the gas turbine engine at an idle speed, and maintaining a constant fuel flow rate via a Main Fuel Metering Valve (MFMV) controlled by an electronic controller. 14

In addition to one or more of the features described above, or as an alternative to any of the foregoing embodiments, wherein determining a delta pressure $P_{Delta-Normal}$ includes measuring a PF3 pressure downstream from a Main Fuel Metering Valve (MFMV) and a Fuel Flow Meter (FFM), measuring a fuel flow at the FFM and measuring a combustor pressure Pb within a combustion chamber while the gas turbine engine is operating under the normal operating condition. 15

In addition to one or more of the features described above, or as an alternative to any of the foregoing embodiments, wherein determining a delta pressure $P_{Delta-Normal}$ further includes subtracting a predicted pressure drop $P_{man\_plum}$ from the PF3 pressure to determine a $P_{vup}$ value and subtracting the combustor pressure Pb from the $P_{vup}$ value. 16

In addition to one or more of the features described above, or as an alternative to any of the foregoing embodiments, wherein controlling includes controlling the selected PMV via an electronic controller to cause the fuel flow rate to the selected AC Nozzle to at least one of decrease and increase. 17

In addition to one or more of the features described above, or as an alternative to any of the foregoing embodiments, wherein determining a delta pressure $P_{Delta-Modified}$ includes measuring a PF3 pressure downstream from a Main Fuel Metering Valve (MFMV) and a Fuel Flow Meter (FFM), measuring a fuel flow at the FFM and measuring a combustor pressure Pb within a combustion chamber while the gas turbine engine is operating under the modified operating condition. 18

In addition to one or more of the features described above, or as an alternative to any of the foregoing embodiments, wherein determining a delta pressure $P_{Delta-Modified}$ further includes subtracting a predicted pressure drop $P_{man\_plum}$ from the PF3 pressure to determine a $P_{vup}$ value and subtracting the combustor pressure Pb from the $P_{vup}$ value. 19

In addition to one or more of the features described above, or as an alternative to any of the foregoing embodiments, wherein comparing includes comparing the delta pressure $P_{Delta-Normal}$ with the delta pressure $P_{Delta-Modified}$ to identify if a variation exists between the delta pressure $P_{Delta-Normal}$ and the delta pressure $P_{Delta-Modified}$.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of illustration and not limitation with reference to the FIGS.

Figure 1:
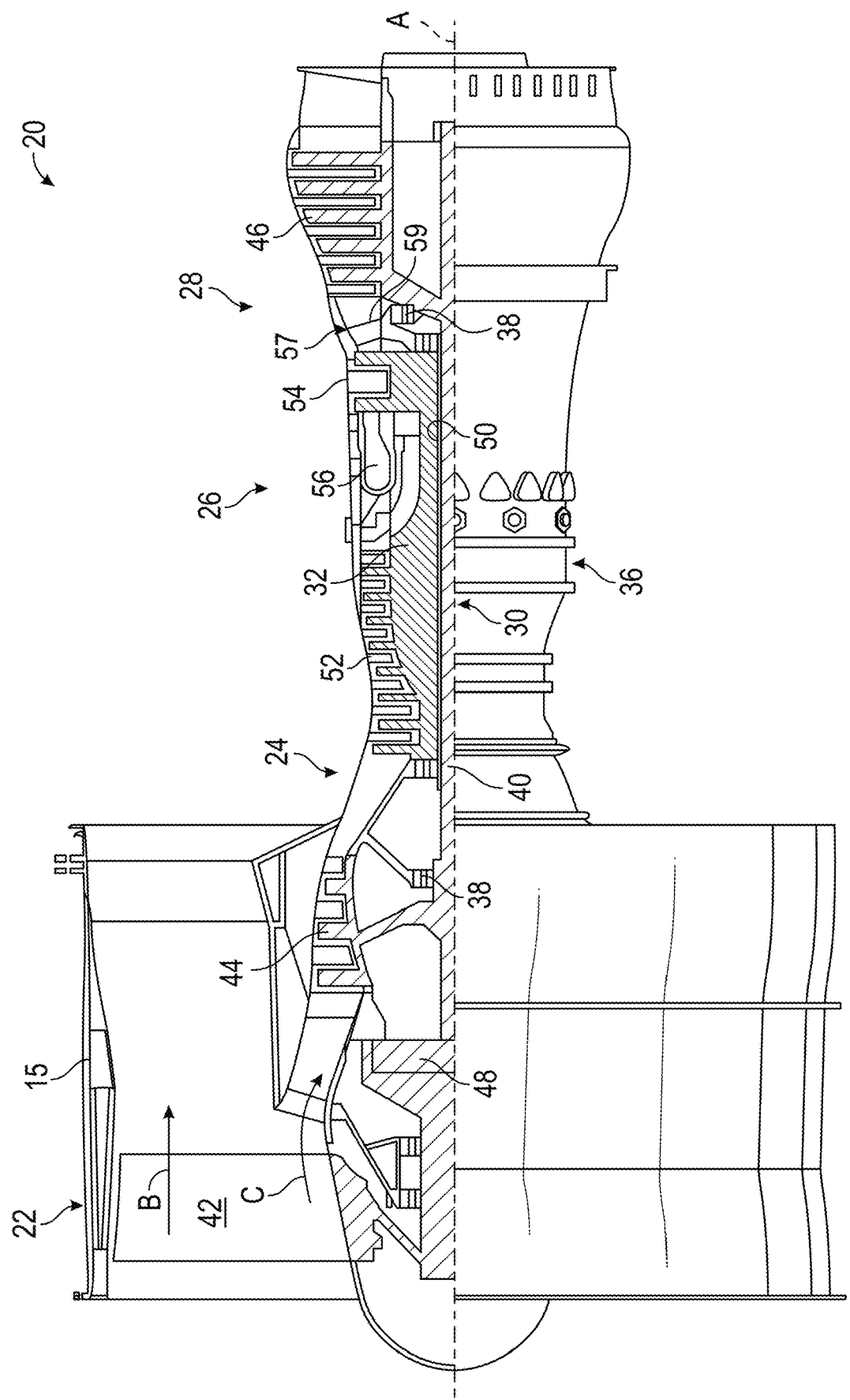
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In one non-limiting embodiment, the geared architecture 48 is an epicyclic gear train, such as a planetary gear system or other gear system, with a gear reduction ratio. In one non-limiting embodiment, the fan diameter is significantly larger than that of the low pressure compressor 44. The geared architecture 48 may be an epicycle gear train, such as a planetary gear system or other gear system. It should be understood, however, that the above parameters are only exemplary of one embodiment of a geared architecture engine and that the present disclosure is applicable to other gas turbine engines including direct drive turbofans. A significant amount of thrust is provided by the bypass flow B due to the high bypass ratio.

In an embodiment, the invention provides a method to detect a failure and/or a loss of calibration of an Actively Controlled Fuel Nozzle (AC Nozzle) in the gas turbine engine, without the use of position feedback sensors. Gas turbine engines include a plurality of AC Nozzles that are evenly spaced around the circumference of the combustor diffuser nozzle case and which are controlled by an N number of Proportional Metering Valves (PMVs) to inject a highly atomized precisely formed spray of fuel into the combustion chamber. The method of the invention involves determining the delta pressure $P_{Delta-Normal}$ across the N number of PMVs ($PMV_n$ to $PMV_{N-n}$) while the gas turbine engine is being operated under normal operating conditions, such as idle condition. After the $P_{Delta-Normal}$ is determined, as the gas turbine engine is being operated, the PMV for a selected AC Nozzle is controlled to cause the fuel flow to the selected AC Nozzle to vary (i.e., increase and/or decrease). The delta pressure $P_{Delta-Modified}$ for the selected AC Nozzle is determined and the fuel flow at the Fuel Flow Meter (FFM) is measured (to confirm a stable fuel flow) as the fuel flow to the selected AC Nozzle is varied. The variation between the delta pressure $P_{Delta-Normal}$ during normal operating conditions and the delta pressure $P_{Delta-Modified}$ during modified operating conditions (for example, $P_{Delta-Normal} - P_{Delta-Modified}$) will indicate whether the PMV for the selected AC Nozzle is operating normally, is out of calibration or has failed.

The method further includes measuring the pressure downstream of the fuel metering valve (MFMV) and the Fuel Flow Meter (FFM) using a pressure transducer (PF3) as well as measuring the combustor pressure Pb while the selected AC Nozzle is operated under normal operating conditions and under the modified fuel flow condition. Additionally, a predicted pressure map of the total fuel flow is used to determine the pressure drop $P_{man\_plum}$ across the manifold and fuel lines at a point prior to the fuel being distributed to each of the PMVs. The delta pressure is given by $P_{delta} = P_{vup} - Pb$, where $P_{vup}$ is given by $P_{vup} = PF3 - P_{man\_plum}$.

Figure 2:
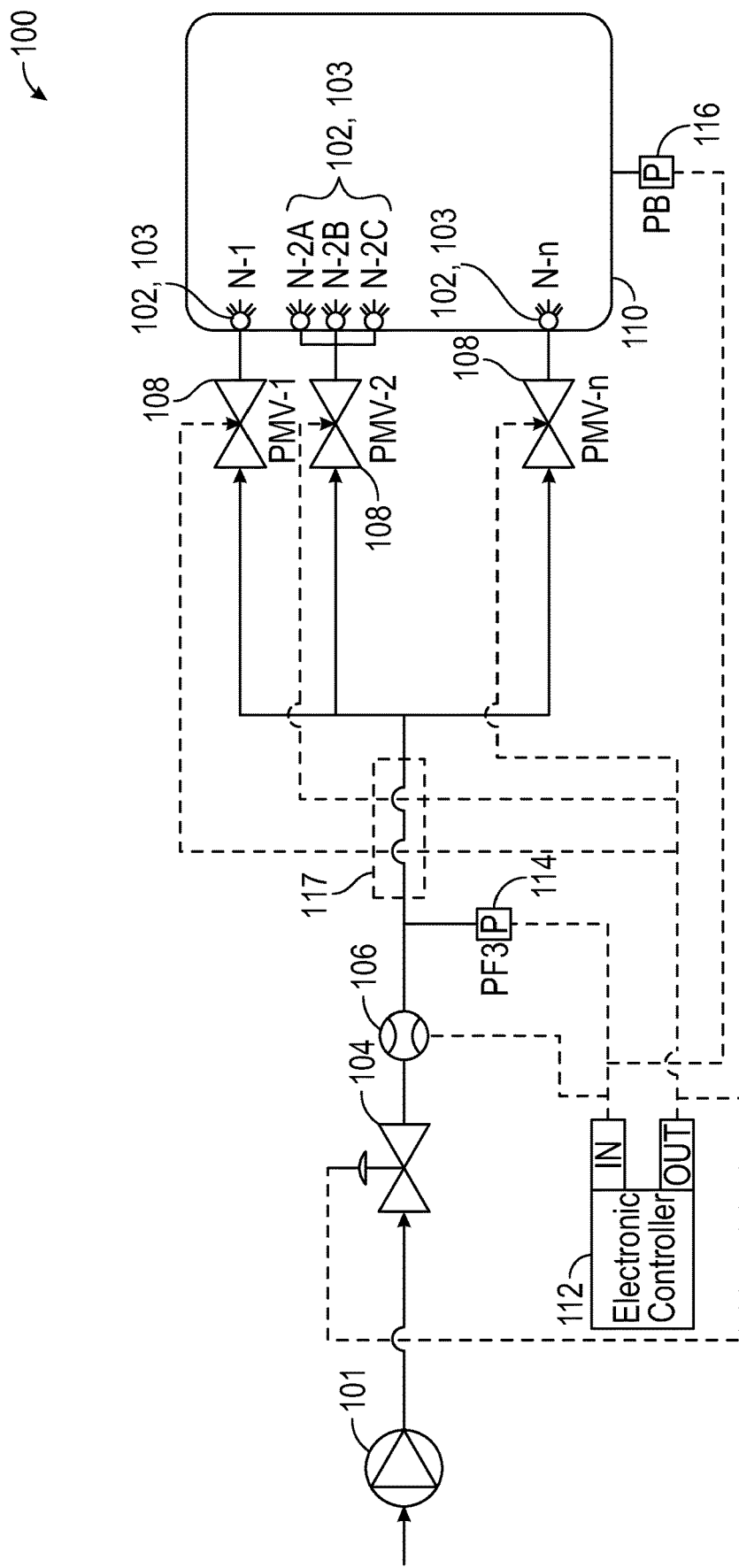
FIG. 2 is a schematic block diagram illustrating a fuel flow system for a gas turbine engine, in accordance with this disclosure.

Referring to FIG. 2, a schematic block diagram illustrating one embodiment of a fuel flow system for a turbine engine 100 is shown, wherein the turbine engine 100 includes a fuel pump 101 which is in flow communication with a Main Fuel Metering Valve (MFMV) 104 and a Fuel Flow Meter (FFM) 106. The MFMV 104 and the FFM 106 are in flow communication with one or more Proportional Metering Valves (PMVs) 108 which are configured to control the fuel flow to one or more of a plurality of AC Nozzles 102 which are configured to receive a fuel flow, atomize the received fuel flow and inject the atomized fuel into a combustion chamber/burner 110 of the turbine engine 100 as a precisely formed spray of fuel. An electronic controller 112 is provided and is in signal communication with the MFMV 104, the FFM 106 and each of the PMVs 108 to control, and/or receive data from, the MFMV 104, the FFM 106 and each of the PMVs 108.

The turbine engine 100 further includes a fuel flow pressure transducer 114 and a combustion chamber pressure transducer 116. The fuel flow pressure transducer 114, which is in flow communication with the FFM 106 and is in signal communication with the electronic controller 112, is configured to measure the fuel flow pressure PF3 downstream of the MFMV 104 and the FFM 106 and upstream of the one or more PMVs 108. The combustion chamber pressure transducer 116, which is associated with the combustion chamber/burner 110 and is in signal communication with the electronic controller 112, is configured to measure the combustion pressure Pb within the combustion chamber/burner 110.

Figure 3:
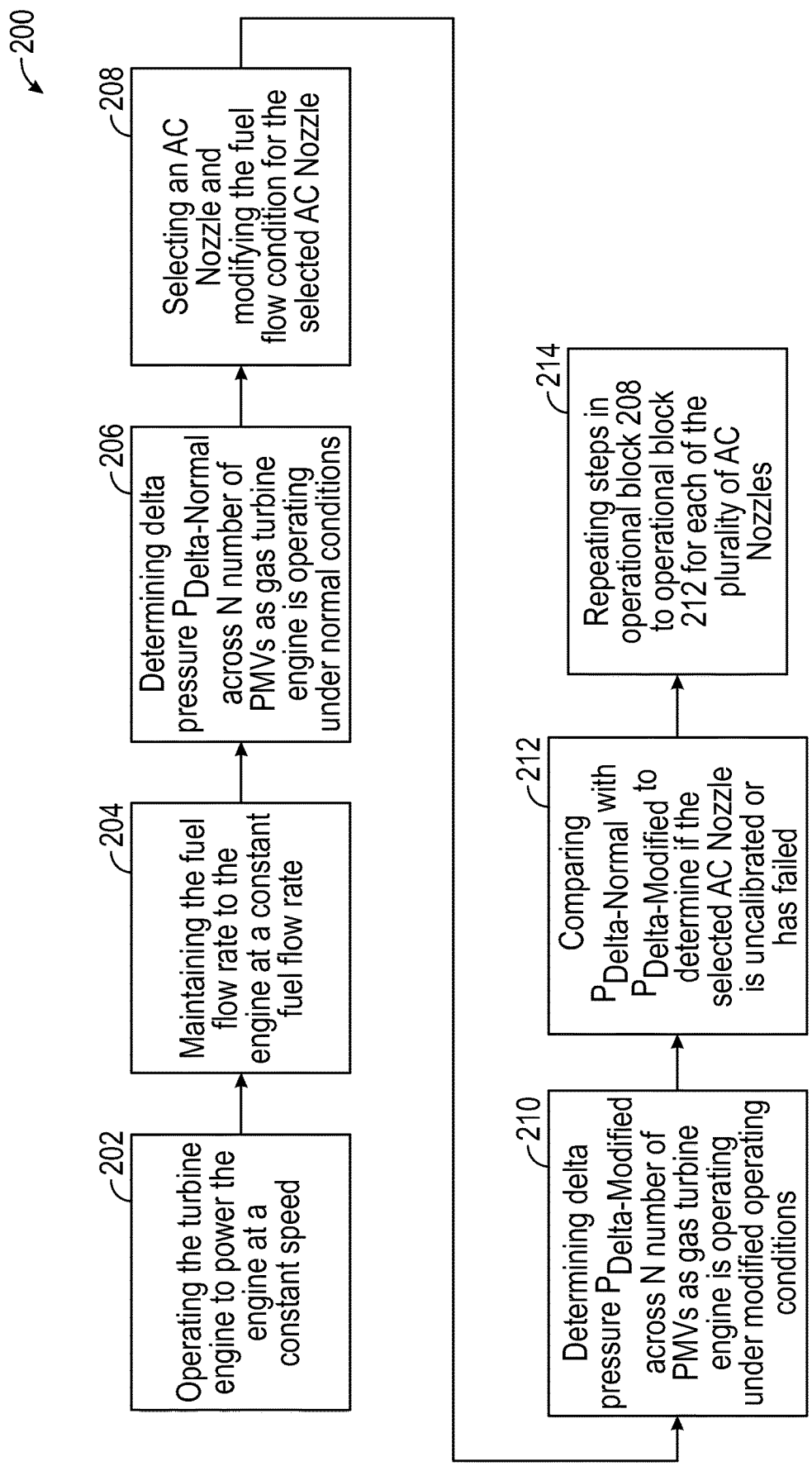
FIG. 3 is an operational block diagram illustrating a method for detecting performance degradation of an Actively Controlled Fuel Nozzle (AC Nozzle) in a gas turbine engine, in accordance with this disclosure.

Referring to FIG. 3, an operational block diagram illustrating a method 200 for detecting performance degradation of an AC Nozzle 102 in a gas turbine engine 100 is provided, in accordance with an embodiment. The method 200 includes operating the turbine engine 100 to power the engine at a constant speed (e.g., idle), as shown in operational block 202. The fuel flow rate to the engine is then maintained at a constant fuel flow rate, as shown in operational block 204. The delta pressure $P_{Delta-Normal}$ across the combined N number of PMVs ($PMV_n$ to $PMV_{N-n}$) as the gas turbine engine is operating under normal operating conditions (e.g., idle) is determined, as shown in operational block 206. This may be accomplished by measuring the pressure downstream of the Main Fuel Metering Valve (MFMV) and the Fuel Flow Meter (FFM) PF3, measuring the fuel flow at the FFM to assure steady fuel flow, measuring the combustor pressure Pb and referencing the predicted pressure map to determine the predicted pressure drop $P_{man\_plum}$ across the manifold and fuel lines at a point prior to the fuel being distributed to each of the PMVs. The value for $P_{vup}$ is then calculated using Equation 1:

$$P_{vup} = PF3 - P_{man\_plum}. \quad \text{(Equation 1)}$$

wherein, PF3 is the pressure downstream of the fuel metering valve (MFMV) and the Fuel Flow Meter (FFM) and $P_{vup}$ is the difference between the P3 pressure and the predicted pressure drop $P_{man\_plum}$ across the manifold and fuel lines at node 117, which is a point prior to the fuel being distributed to each of the PMVs.

The delta pressure $P_{Delta-Normal}$ across the combined N number of PMVs ($PMV_n$ to $PMV_{N-n}$) as the gas turbine engine is operating under normal operating conditions can then be determined using Equation 2:

$$P_{Delta-Normal} = P_{vup} - Pb, \quad \text{(Equation 2)}$$

wherein, Pb is the combustor pressure and $P_{vup}$ is the difference between the PF3 pressure and the predicted pressure drop $P_{man\_plum}$ across the manifold and fuel lines at node 117 which is a point prior to the fuel being distributed to each of the PMVs. The method 200 further includes selecting an AC Nozzle 103, from the plurality of AC Nozzles 102, to be tested, and modifying the fuel flow condition to the selected AC Nozzle 103 to cause the gas turbine engine to operate under a modified operating condition, as shown in operational block 208. This may be accomplished by controlling the appropriate PMV 108 for the selected AC Nozzle 103 via the electronic controller 112 to either decrease or increase the fuel flow rate condition of the selected AC Nozzle 103.

The delta pressure $P_{Delta-Modified}$ across the combined N number of PMVs ($PMV_n$ to $PMV_{N-n}$) as the gas turbine engine is operating under the modified operating condition is determined, as shown in operational block 210. This may be accomplished by measuring the pressure downstream of the fuel metering valve (MFMV) and the Fuel Flow Meter (FFM) PF3 under the modified operating condition, measuring the fuel flow at the FFM to assure steady fuel flow, measuring the combustor pressure Pb and calculating the value for $P_{vup}$ using Equation 1 ($P_{vup}$=PF3–$P_{man\_plum}$). The delta pressure $P_{Delta-Modified}$ is then calculated using Equation 2 ($P_{Delta-Normal}$=$P_{vup}$–Pb).

It should be appreciated that PF3 pressure may be measured downstream of the Main Fuel Metering Valve (MFMV) 104 and the Fuel Flow Meter (FFM) 106 via the fuel flow pressure transducer 114 and the combustor pressure Pb may be measured using the combustion chamber pressure transducer 116. The delta pressure $P_{Delta-Normal}$ across the combined N number of PMVs ($PMV_n$ to $PMV_{N-n}$) as the gas turbine engine is operating under normal operating conditions is then compared with the delta pressure $P_{Delta-Modified}$ across the combined N number of PMVs ($PMV_n$ to $PMV_{N-n}$) as the gas turbine engine is operating under the modified operating condition to identify any variations between $P_{Delta-Normal}$ and $P_{Delta-Modified}$, as shown in operational block 212. A variation between the $P_{Delta-Normal}$ and $P_{Delta-Modified}$ will indicate whether the PMV for the selected AC Nozzle is operating normally, is operating out of calibration or has failed. The steps in operational block 208 to operational block 212 of the method 200 are then repeated for each of the plurality of AC Nozzles 102, as shown in operational block 214.

It should be appreciated that by deriving the change in total fuel flow path area while modifying the valve to operate from fully open to fully closed, the health of each of the fuel flow paths can be checked, and by comparing the data received/measured/calculated against a nominal map (i.e., calibration curves which may be stored in memory) the fuel flow path may be calibrated, wherein the calibration for the fuel flow path may be stored in memory for use while the gas turbine engine is running. Moreover, by trending the changes in total fuel flow path area, if the performance of a PMV drifts, the drift of the PMV may be monitored over and may be used as a prognostic health indicator. Additionally, the trend may also be used to indicate when maintenance is required.

It should be appreciated that the method 200 may be performed via a software Initiated Built-In Test (IBIT) which may be performed automatically upon startup or during operation. Moreover, the method of the invention includes an embodiment where the MFMV 104, the plurality of AC Nozzles 102, the fuel flow pressure transducer 114 and the combustor pressure Pb may be used to generate calibration curves which can be used for calibration purposes. The electronic controller 112 may control the plurality of PMVs 108 to cause each of the plurality of AC Nozzles 102 to operate over their full stroke at a predetermined engine power level (e.g., idle). The MFMV 104, the FFM 06, the fuel flow pressure transducer 114 and the combustion chamber transducer 116 may then measure the fuel flow at the FFM to assure steady fuel flow, the PF3 pressure and down-stream pressures and use these pressures to calculate calibration curves for each of the plurality of AC Nozzles 102. Moreover, the changing of the calibration curves calculated for a series of engine starts and engine runs can be used to document trend changes in AC Nozzle calibration. This can ultimately be used for prognostic health management to maintain accuracy and to predict possible failure and/or when to service the AC nozzles 102. Additionally, although the invention is disclosed herein as being used with fuel nozzles used in a gas turbine engine, it should be appreciated that the method of the invention may be used with any system that uses one or more Actively Controlled Nozzles to spray or disperse a fluid.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

In accordance with one or more embodiments, the processing of at least a portion of the method in FIG. 3 may be implemented by a controller/processor disposed internal and/or external to a computing device. In addition, processing of at least a portion of the method in FIG. 3 may be implemented through a controller/processor operating in response to a computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt (s), communication interface(s), and input/output signal interface(s), as well as combination comprising at least one of the foregoing.

Additionally, the invention may be embodied in the form of a computer or controller implemented processes. The invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire When implemented on a general-purpose microprocessor the computer program code segments may configure the microprocessor to create specific logic circuits.

While the present disclosure has been described with reference to an exemplary embodiment or embodiments, it will be understood by those skilled in the art that various changes may be made and equivalents may be substituted for elements thereof without departing from the scope of the present disclosure. Moreover, the embodiments or parts of the embodiments may be combined in whole or in part without departing from the scope of the invention. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this disclosure, but that the present disclosure will include all embodiments falling within the scope of the claims.

What is claimed is:

1. A method for detecting performance degradation of an Actively Controlled Fuel Nozzle (AC Nozzle) in a gas turbine engine, the gas turbine engine comprising: a Main Fuel Metering Valve (MFMV), a Fuel Flow Meter (FFM) downstream from the MFMV, a manifold and fuel lines downstream from the FFM, a Number of Proportional Metering Valves (PMVs), and a plurality of AC Nozzles, wherein each Proportional Metering Valve (PMV) of the Number of PMVs associated with a AC Nozzle of the plurality of AC Nozzles on each of the fuel lines; and the method comprising:

operating the gas turbine engine under a normal operating condition to power the gas turbine engine at a constant speed by providing a fuel flow to a combustion chamber;

maintaining the fuel flow rate of the fuel flow to the combustion chamber of the gas turbine engine at a constant fuel flow rate;

determining a delta pressure $P_{Delta-Normal}$ across the N number of PMVs as the gas turbine engine is operating under the normal operating condition, wherein determining the delta pressure $P_{Delta-Normal}$ includes:

measuring a PF3 pressure downstream from the FFM, measuring a fuel flow rate of the fuel flow at the FFM, and measuring a combustor pressure $P_b$ within the combustion chamber;

referencing a predicted pressure map to determine a predicted pressure drop $P_{man\_plum}$ across the manifold and the fuel lines at a point downstream from the FFM and upstream from the manifold and the fuel lines; and subtracting the predicted pressure drop $P_{man\_plum}$ from the PF3 pressure to determine a $P_{vup}$ value and subtracting the combustor pressure $P_b$ from the $P_{vup}$ value;

selecting a PMV from the N number of PMVs and the associated AC Nozzle from the plurality of AC Nozzles;

controlling the selected PMV to modify a fuel flow rate to the associated AC Nozzle to cause the gas turbine engine to operate under a modified fuel flow condition;

determining a delta pressure $P_{Delta-Modified}$ across the N number of PMVs as the gas turbine engine is operating under the modified fuel flow condition; and comparing the delta pressure $P_{Delta-Normal}$ with the delta pressure $P_{Delta-Modified}$ to determine whether the associated AC Nozzle is uncalibrated or has failed.

2. The method of claim 1, wherein the constant speed is an idle speed.

3. The method of claim 1, wherein the maintaining includes maintaining the constant fuel flow rate via the MFMV controlled by an electronic controller.

4. The method of claim 1, wherein the controlling includes controlling the selected PMV via an electronic controller to cause the fuel flow rate to the associated AC Nozzle to decrease.

5. The method of claim 1, wherein the controlling includes controlling the selected PMV via an electronic controller to cause the fuel flow rate to the associated AC Nozzle to increase.

6. The method of claim 1, wherein determining the delta pressure $P_{Delta-Modified}$ includes measuring a PF3 pressure downstream from the FFM, measuring a fuel flow rate at the FFM, and measuring a combustor pressure $P_b$ within the combustion chamber while the gas turbine engine is operating under the modified fuel flow condition.

7. The method of claim 6, wherein determining the delta pressure $P_{Delta-Modified}$ further includes referencing the predicted pressure map to determine a predicted pressure drop $P_{man\_plum}$ across the manifold and the fuel lines at the point downstream from the FFM and upstream from the manifold and the fuel lines while the gas turbine engine is operating under the modified fuel flow condition.

8. The method of claim 7, wherein determining the delta pressure $P_{Delta-Modified}$ further includes subtracting the predicted pressure drop $P_{man\_plum}$ from the PF3 pressure to determine a $P_{vup}$ value and subtracting the combustor pressure $P_b$ form the $P_{vup}$ value while the gas turbine engine is operating under the modified fuel flow condition.

9. The method of claim 1, wherein the comparing includes comparing the delta pressure $P_{Delta-Normal}$ with the delta pressure $P_{Delta-Modified}$ to identify whether a variation exists between the delta pressure $P_{Delta-Normal}$ and the delta pressure $P_{Delta-Modified}$.

10. A method for detecting performance degradation of an Actively Controlled Fuel Nozzle (AC Nozzle) in a gas turbine engine, the gas turbine engine comprising: a Main Fuel Metering Valve (MFMV), a Fuel Flow Meter (FFM) downstream from the MFMV, a manifold and fuel lines downstream from the FFM, a Number of Proportional Metering Valves (PMVs), and a plurality of AC Nozzles, wherein each Proportional Metering Valve (PMV) of the Number of PMVs associated with a AC Nozzle of the plurality of AC Nozzles on each of the fuel lines; and the method comprising:

operating the gas turbine engine under a normal operating condition to power the gas turbine engine at a constant speed by providing a fuel flow to a combustion chamber and maintaining a constant fuel flow rate of the fuel flow to the combustion chamber via the MFMV;

determining a delta pressure $P_{Delta-Normal}$ across the N number of PMVs as the gas turbine engine is operating under the normal operating condition, wherein determining the delta pressure $P_{Delta-Normal}$ includes:

measuring a PF3 pressure downstream from the FFM, measuring a fuel flow rate at the FFM, and measuring a combustor pressure $P_b$ within the combustion chamber; and subtracting a predicted pressure drop $P_{man\_plum}$ from the PF3 pressure to determine a $P_{vup}$ value and subtracting the combustor pressure $P_b$ from the $P_{vup}$ value;

controlling a selected PMV from the N number of PMVs to modify a fuel flow rate to the associated AC Nozzle to cause the gas turbine engine to operate under a modified fuel flow condition;

determining a delta pressure $P_{Delta-Modified}$ across the N number of PMVs as the gas turbine engine is operating under the modified fuel flow condition; and comparing the delta pressure $P_{Delta-Normal}$ with the delta pressure $P_{Delta-Modified}$ to determine whether the selected AC Nozzle is uncalibrated or has failed.

11. The method of claim 10, wherein the constant speed includes an idle speed.

12. The method of claim 10, wherein the controlling includes controlling the selected PMV via an electronic controller to cause the fuel flow rate to the associated AC Nozzle to at least one of decrease and increase.

13. The method of claim 10, wherein determining the delta pressure $P_{Delta-Modified}$ includes measuring a PF3 pressure downstream from the FFM, measuring a fuel flow rate at the FFM, and measuring a combustor pressure $P_b$ within the combustion chamber while the gas turbine engine is operating under the modified fuel flow condition.

14. The method of claim 13, wherein determining the delta pressure $P_{Delta-Modified}$ further includes subtracting a predicted pressure drop $P_{man\_plum}$ from the PF3 pressure to determine a $P_{vup}$ value and subtracting the combustor pressure $P_b$ from the $P_{vup}$ value while the gas turbine engine is operating under the modified operating condition.

15. The method of claim 10, wherein the comparing includes comparing the delta pressure $P_{Delta-Normal}$ with the delta pressure $P_{Delta-Modified}$ to identify whether a variation exists between the delta pressure $P_{Delta-Normal}$ and the delta pressure $P_{Delta-Modified}$.

16. A method for detecting performance degradation of an Actively Controlled Fuel Nozzle (AC Nozzle) in a gas turbine engine, the gas turbine engine comprising: a Main Fuel Metering Valve (MFMV), a Fuel Flow Meter (FFM) downstream from the MFMV, a manifold and fuel lines downstream from the FFM, a Number of Proportional Metering Valves (PMVs), and a plurality of AC Nozzles, wherein each Proportional Metering Valve (PMV) of the Number of PMVs associated with a AC Nozzle of the plurality of AC Nozzles on each of the fuel lines; and the method comprising:

operating the gas turbine engine under a normal operating condition to power the gas turbine engine at a constant speed by providing a fuel flow to a combustion chamber;

maintaining the fuel flow rate of the fuel flow to the combustion chamber of the gas turbine engine at a constant fuel flow rate;

determining a delta pressure $P_{Delta-Normal}$ across the N number of PMVs as the gas turbine engine is operating under the normal operating condition;

selecting a PMV from the N number of PMVs and the associated AC Nozzle from the plurality of AC Nozzles;

controlling the selected PMV to modify a fuel flow rate to the associated AC Nozzle to cause the gas turbine engine to operate under a modified fuel flow condition;

determining a delta pressure $P_{Delta-Modified}$ across the N number of PMVs as the gas turbine engine is operating under the modified fuel flow condition, wherein determining the delta pressure $P_{Delta-Modified}$ includes:

measuring a PF3 pressure downstream from the FFM, measuring a fuel flow at the FFM, and measuring a combustor pressure $P_b$ within the combustion chamber while the gas turbine engine is operating under the modified fuel flow condition;

referencing a predicted pressure map to determine a predicted pressure drop $P_{man\_plum}$ across the manifold and the fuel lines at a point downstream from the FFM and upstream from the manifold and the fuel lines while the gas turbine engine is operating under the modified fuel flow condition;

subtracting the predicted pressure drop $P_{man\_plum}$ from the PF3 pressure to determine a $P_{vup}$ value and subtracting the combustor pressure $P_b$ from the $P_{vup}$ value while the gas turbine engine is operating under the modified fuel flow condition; and comparing the delta pressure $P_{Delta-Normal}$ with the delta pressure $P_{Delta-Modified}$ to determine whether the associated AC Nozzle is uncalibrated or has failed.

* * * * *